Figure 1:
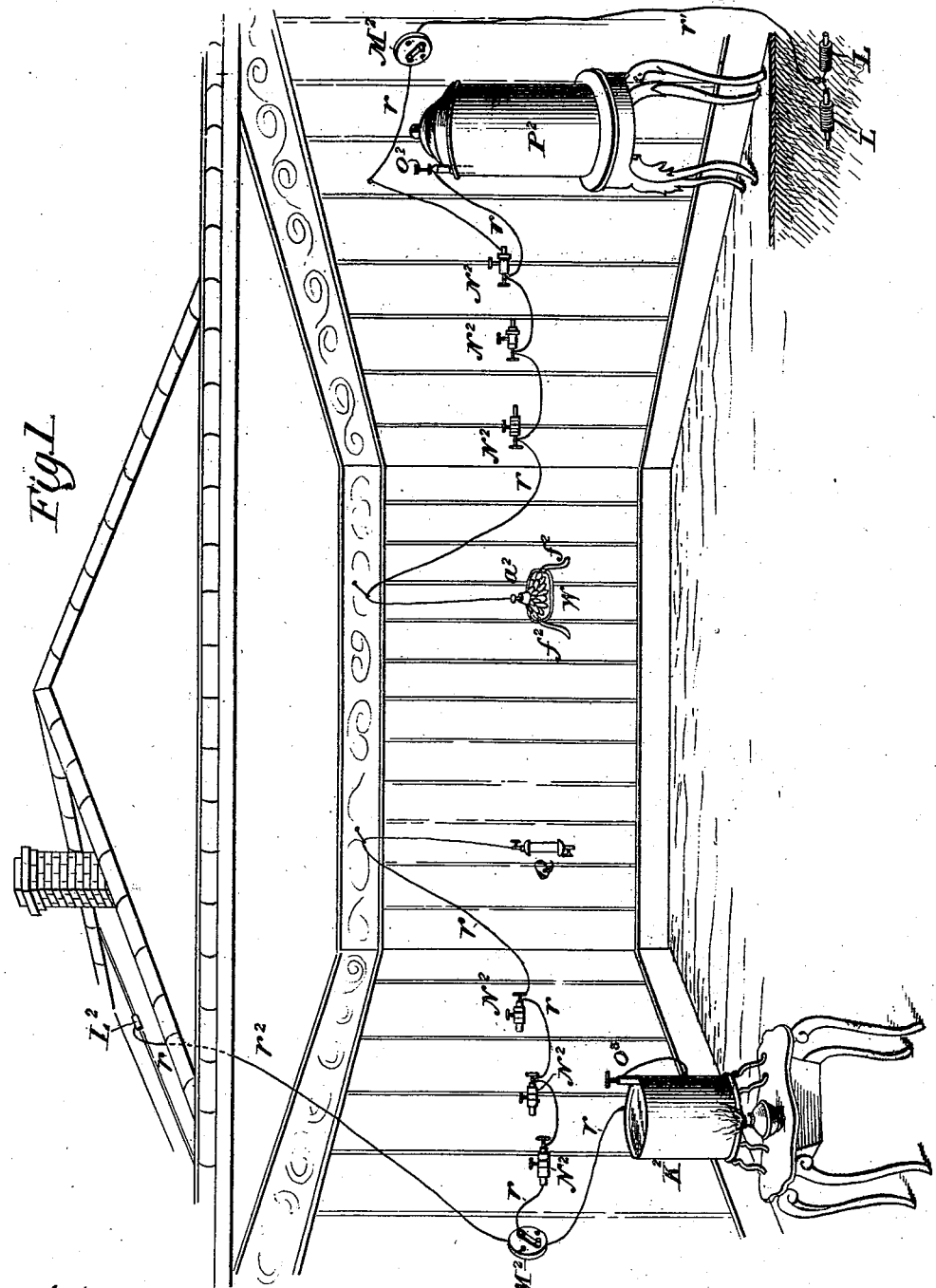

(No Model.) 3 Sheets—Sheet 2.

H. SANCHE.
APPARATUS FOR TREATING DISEASES.

No. 587,237. Patented July 27, 1897.

Witnesses: Inventor.
Hercules Sanche.
By James L. Norris,
Atty.

(No Model.) 3 Sheets—Sheet 3.

H. SANCHE.
APPARATUS FOR TREATING DISEASES.

No. 587,237. Patented July 27, 1897.

Witnesses: Inventor.
Hercules Sanche.
By James L. Norris.
Atty.

UNITED STATES PATENT OFFICE

HERCULES SANCHE, OF NEW ORLEANS, LOUISIANA, ASSIGNOR TO THE ANIMARIUM COMPANY, OF NEW YORK, N. Y.

APPARATUS FOR TREATING DISEASES.

SPECIFICATION forming part of Letters Patent No. 587,237, dated July 27, 1897.

Application filed October 27, 1887. Serial No. 253,491. (No model.)

*To all whom it may concern:*

Be it known that I, HERCULES SANCHE, a citizen of the United States, residing at New Orleans, in the parish of Orleans and State of Louisiana, have invented a new and Improved Method of and Apparatus for Treating Diseases, of which the following is a specification.

In an application for a patent filed by me September 17, 1885, Serial No. 177,387, I have advanced certain new ideas and theories concerning the disturbance of the normal functions of life commonly known as "disease." My observation and experience justify the belief that most diseases, and especially those of a nervous character, are due to a disturbance of the electrical equilibrium of the body. It is well known that the earth and the surrounding envelop of air are strongly charged with an opposite polarity, and that any disturbance of the normal relations of these forces, such as occurs before a thunderstorm, results in discomfort to the whole animal tribe. The habits of civilized life—*i. e.,* the wearing of shoes and clothing of non-conducting material and the insulation from the earth by dry floors and feather beds—prevent the body from partaking freely of the electrical equilibrium of the earth, and a preponderance of an electric tension of either a positive or negative character in the body produces by a stimulation or suppression of chemico-vital function the abnormal condition of things the symptoms of which we call "disease." Hogs in the field, turtles, aligators, and the lower animals that lie in the mud and readily partake of or assimilate themselves to the electrical conditions of the earth are notoriously free from disease and nervousness. Man, the feathered tribe, and higher animals who are covered with a non-conducting coat and are more or less insulated from the earth are subject to these difficulties in marked contrast. Pursuing this theory, I have undertaken to correct these difficulties not by an attack upon the symptoms after the manner of medication, but by the logical process of bringing to bear upon the system a set of influences reverse to those which involved the difficulties.

In my first application I only contemplated the restoration of electrical equilibrium by a metallic or conductive contact between the body and the earth. My present application comprehends even a wider scope and a more general application, in that it does not simply comprehend a preservation of electrical equilibrium, for this would only seem to preserve health, but it contemplates the removal of abnormal conditions by producing an electrical tension in the body contrary to that which superinduced the disease, and for this purpose I have found that the contact of the body through a small conductor with a source of extraordinary heat or extraordinary cold permits me to produce either a positive or negative condition in the body without connection with the earth, it being remembered at the outstart that the electrical condition referred to by me has nothing whatever to do with galvanism or dynamic currents, but is only a condition of electric potential or static polarity. This agency permits me to reach all the functions of the body and bring them into healthy and effective action, stimulating the chemico-vital processes without having to rely upon the single channel of an enfeebled and diseased stomach, which is almost the only avenue of treatment by medication.

The apparatus which I use for carrying out my invention is of an extremely simple character and is shown in various application in the accompanying drawings, in which—

Figure 2:
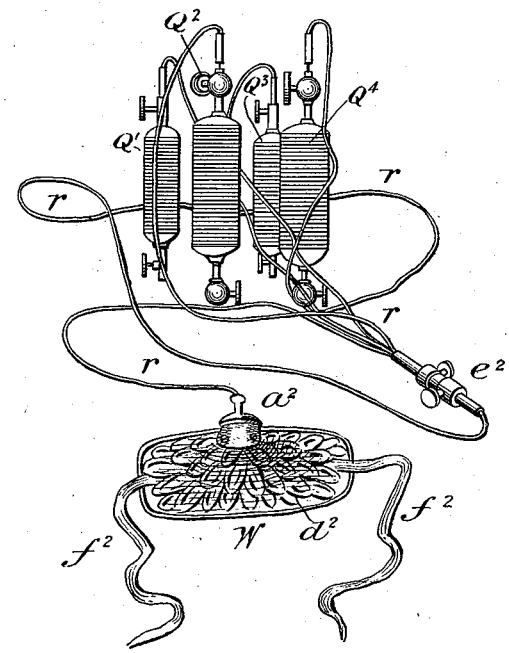
Figure 3:
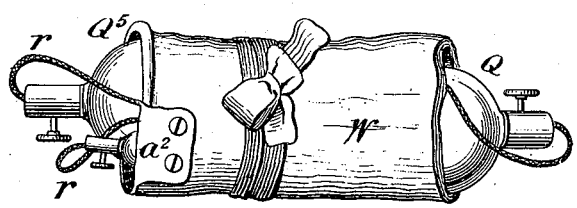
Figure 4:

Figure 1 represents an office or chamber of a dwelling equipped with an apparatus on the right for connection with the earth or a water-cooler, while on the left is an apparatus for connection with a lamp-stove or the roof of the building. Figs. 2 and 3 represent two forms of portable apparatus, Fig. 3 being folded; and Fig. 4 shows an application of the device shown in Fig. 2 to a patient.

In Fig. 1, $P^2$ represents a water-cooler, which is a convenient domestic article for applying electric effects of cold to the body. This cooler is connected, by a binding-screw $o^2$, with a wire or tinsel cord $r$, which is supported along the sides of the room upon brackets or binding-posts $N^2$, fastened into the wall. At the end of this cord a metal clasp $a^2$ connects the conducting wire or filament of the cord with a pad W, which may have an exposed metal surface of scales, plates, or coils, as in Fig. 2, or which scales, plates, or coils may be contained within the layers of the pad and be brought in electrical contact with any portion of a patient's body by wetting the pad. This pad has tie-cords $f^2$ to facilitate its application to the body. $M^2$ is an electrical switch by which the wire $r$ may be thrown into contact with a ground-wire $r'$, which has a metal anchor L embedded in the moist earth, and which connection renders it possible to connect the patient with the earth to put him in the same electric tension with the earth. On the left of the same figure is shown a lamp-stove $K^2$, the metal casing of which is by a binding-post $o^3$ connected to the wire $r$, carried on brackets or binding-posts $N^2$, and to the end of which wire is attached an electrode Q of cylindrical shape for application to the body. A switch $M^2$ serves also to connect wire $r$ to a branch wire $r^2$, which connects with a plate $L^2$ on the metal roof of the building, so as to make available solar heat. The two sets of apparatus shown in this figure serve to carry out the principle of my invention with opposite effects. It is not pretended that there is any flow of current or any of the phemomena of dynamic electricity manifest in this apparatus, but only a charging of the body with a certain magnetic polarity, the effects of which upon the system are remarkable in stimulating the system to throw off disease. The cold or earth connection I find almost universally applicable to allay nervousness and stimulate the system by counteracting one polarity of the body.

The hot connection is for the opposite polarity—such, for instance, as exists in inflammatory fevers—its effect being usually to first raise the temperature and then bring the body to a normal temperature by dissipating congestion and starting the perspiration.

The manner in which I believe the charging of the body with a positive or negative polarity acts upon the system to effect physiological changes is by the exertion of an attractive influence and the stimulating of an endosmose of gases of the air through the capillaries and electrolytic action in the cells, which agencies by intelligent application are made to arrest various disorders.

In Figs. 2 and 3 are shown portable examples of my apparatus. In Fig. 2 a number of cylinders $Q'$ $Q^2$ $Q^3$ $Q^4$ with screw-caps are electrically connected by wires to a coupling $e^2$, which in turn is connected electrically to the clasp $a^2$ on the pad W, formed with metal scales $d^2$ and provided with the tie-cords $f^2$. These metal cylinders $Q'$ $Q^2$, &c., for greater surface simply are made of coiled wire, but they have no function of an electromagnet nor induction-coil. In practice they are to be suspended in a vessel V of ice water and the pad applied to the ankle or wrist of the patient, as shown in Fig. 4. In Fig. 3 a single cylinder $Q^5$ has its pad W wrapped around it and its tie-cords $f^2$ formed into a bow $b^2$, so as to constitute a pocket apparatus.

I am aware that it is well known to apply to patients the cooling effect of direct contact or radiation of hot bricks, bottles of water, &c., and also to apply directly cooling applications of ice. The application of these is entirely different from my invention in that I do not employ the direct conduction of cold or heat, nor do I apply it in the same way. I utilize the influence of a cold or hot object at a distance through a conductor of electricity, the source of its influence being removed to a point out of range of direct radiation or conduction of heat.

Another important and distinguishing feature of my invention is that the wire connection which I employ does not necessarily have the qualities of a conductor for dynamic electricity where flow or passage of the current increases with the increase of cross-sectional areas of the conductor, but I find ordinarily that the best effects are produced with a very small copper wire, varying in size from 24 to 30, and when great variations in temperature—i. e., an intense degree of cold or intense degree of heat—are employed the tendency to best effects are produced by the finer wire, and vice versa. This strengthens my belief that the principle which is made available is not of a dynamic character, but only such small wire is required as to permit the polarity in molecules of the wire to induce a corresponding polarity of the body and to make of the body a feeble magnet of positive or negative polarity, according to the character of the connection (hot or cold) and the nature of the disease.

In substantiating by analogy the effect of hot or cold connection upon magnetism in inanimate things I find by test that a magnet of normal temperature connected at its equator to a body of ice-water by a fine wire will, after a lapse of several days, show a strengthening of its north pole and a weakening of its south pole, the center of magnetism in the south pole moving gradually toward the equator. A magnet similarly connected to a hot body (the heat of a stove) shows precisely the reverse—i. e., a strengthening of the south pole and a weakening of the north pole—and I am led to believe that a similar result takes place in the human body when my invention is applied.

It is not absolutely essential that I should employ different temperatures to get the concomitant effects of magnetic polarity. A body of hydrogen gas can be substituted for the cold application and oxygen for the hot application, and the body of the patient may also be given a polarity by connection with the pole of a permanent or electro magnet.

Having thus fully described my invention, what I claim, and desire to secure by Letters Patent, is—

The clinical instrument comprising a contact plate or member adapted to be attached to the body to be treated, a second plate or member adapted to be placed in or under the influence of a temperature higher or lower than the body to which the other plate is attached, or under the influence of matter which is electropositive or electronegative to the body having said other plate or member attached to it, and a flexible conducting or transmitting medium connecting said two plates or members, said medium being of a relatively small size to said plates or members and of a length sufficient to permit said two plates or members to be placed at such distances apart that the body having one plate or member attached thereto will be removed beyond the range of influence transmitted by direct radiation, conduction or contact from said other plate or member, substantially as described.

HERCULES SANCHE.

Witnesses:
EDW. W. BYRN,
SOLON C. KEMON.